Oct. 25, 1960 T. KILBURN ET AL 2,958,074

MAGNETIC CORE STORAGE SYSTEMS

Filed Aug. 25, 1955

INVENTORS:
TOM KILBURN,
GEORGE R. HOFFMAN

By
Stevens, Davis, Miller & Mosher
Attorneys

United States Patent Office 2,958,074

Patented Oct. 25, 1960

2,958,074

MAGNETIC CORE STORAGE SYSTEMS

Tom Kilburn, Urmston, and George Richard Hoffman, Manchester, England, assignors to National Research Development Corporation, London, England, a corporation of Great Britain Filed Aug. 25, 1955, Ser. No. 530,451

Claims priority, application Great Britain Aug. 31, 1954

13 Claims. (Cl. 340—174)

Figures 1, 2, 3:
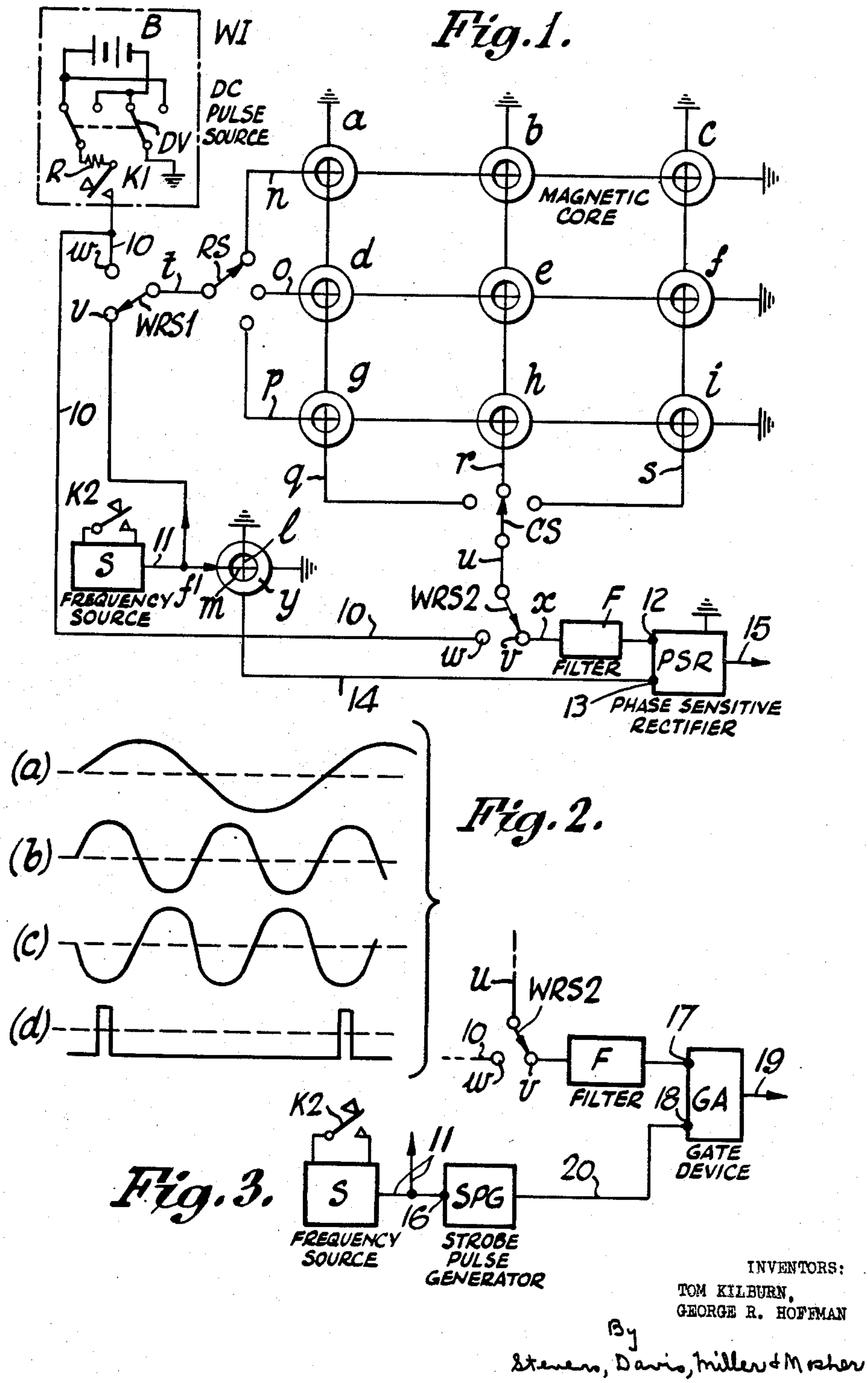

The present invention relates to systems of and apparatus for the storage of digital information, that is to say, information which can be represented by means of digit symbols which may be of one kind (for instance, the numeral "1") or of a different kind (for instance, the numeral "0"). Such arrangements are widely used as information stores in computing apparatus employing the binary system of notation.

It is already known to construct information stores using digital storage devices each in the form of a magnetic core of material having a suitable degree of remanence and in which the direction of polarisation of the remanent magnetic induction in such core is used to indicate which of the two kinds of digit element is registered therein. An information store using such magnetic core devices may comprise a plurality of the devices arranged in a matrix of interlaced electrical connections, each core providing for the storage of one digital element of information. Access to any individual core for the purpose of writing information thereinto or for reading information thereout of may be obtained by arranging for that individual core to lie at the intersection of two appropriately energised co-ordinate elements of the circuit matrix which is interlaced through the cores. Writing of information into a core may be effected by applying to the said core a magnetising force appropriate to magnetise it, preferably to the saturation point, in the particular polarisation sense chosen to represent the required kind of digit element while reading out of information stored in a core may be effected by applying to such core a magnetising force in a given predetermined polarisation sense and detecting whether or not the core undergoes a reversal of its polarity of magnetisation. If there is no reversal then obviously the stored information was of a kind similar to that which would be produced by the applied magnetising force whereas if reversal does take place then the previously stored information was obviously of the other kind. Such magnetic core type storage elements and information stores embodying them are described by An Wang and Way Dong Woo in "Journal of Applied Physics," January 1950, p. 49; by An Wang in "Proceedings of the Institute of Radio Engineers," June 1950, p. 626, and April 1951, p. 401, and by J. A. Rajchman in "Proceedings of the Institute of Radio Engineers," October 1953, p. 1407.

As described by J. R. Anderson in "Communications and Electronics," January 1953, p. 395, another form of storage device utilises materials, commonly known as ferroelectric materials, as a dielectric in a capacitive device in which the equivalent effects are obtained with respect to remanent electric induction instead of remanent magnetic induction and the present invention in many of its aspects is applicable also to such electrically polarisable devices as well as to the previously mentioned magnetically polarisable devices. As the storage effect in each case is dependent largely upon the hysteresis characteristic, either magnetic or dielectric, as the case may be, devices of such magnetic or ferroelectric type will hereinafter, for convenience, be referred to collectively as "hysteresis type storage devices." Such hysteresis type storage devices as have hitherto been proposed require, for satisfactory operation, magnetic or dielectric materials in which the remanent induction value is as nearly as possible equal to the saturation induction value and that the hysteresis characteristic shall have as near a so-called square or rectangular form as can be obtained.

Such known systems have the disadvantage that, in order to read the content of a core, the stored information previously recorded in the core is necessarily destroyed. If, as is usually the case, the original recording is required to be maintained after the reading operation has been completed, it is necessary to make some provision for the rewriting of the previously stored information back into such core following such a read-out operation.

In copending patent application Serial No. 467,583, filed November 8, 1954, by Frederic C. Williams, now Patent No. 2,845,611, granted on July 29, 1958, there is described an arrangement for reading-out information recorded in a magnetic core storage device similar to those referred to above, in a manner which is non-destructive of the previous record and this is effected by energising two (row and column) conductors, which interlace the matrix and which intersect in the required core, with alternating current at dissimilar frequencies, $f1$ and $f2$. Use is made of the fact that the magnetisation characteristic of the core, when in a state of remanent magnetisation, is essentially non-linear and for this reason there will necessarily be generated in an output winding which threads the selected core, the various combination frequencies resulting from the intermodulation of the different applied frequencies $f1$ and $f2$. Moreover, as the non-linearity of the core characteristic in the two opposing directions of magnetic polarisation is asymmetrical, the phase of a selected intermodulation product, for example, the difference beat frequency $f1-f2$, will depend upon the direction of the existing polarisation of the magnetic core. Thus, the phase of the frequency component $f1-f2$ which is generated in the output winding of a particular core will be reversed if the state of magnetisation of such core is reversed.

The aforesaid copending application describes a system making use of this phenomenon in which two frequencies, for example, a frequency $f1$ of 5 mc./s. and a frequency $f2$ of 5 mc./s.–25 kc./s., are fed respectively to the two (row and column) conductors which are required to select the desired core in a two-dimensional matrix. A common output winding which serially threads all of the cores of such matrix is arranged to feed a circuit tuned to select the difference frequency output of 25 kc./s. This output is then compared in a phase-sensitive rectifier with the phase of the 25 kc./s. output which is produced by an output winding from a "standard" core which is permanently held in a chosen one predetermined state of magnetisation (for example, that chosen to represent digit value "0") and which is itself also fed with the aforesaid reading currents of frequencies $f1$ and $f2$.

An object of the present invention is to provide an improved non-destructive reading method, and the necessary apparatus arrangements therefor, for hysteresis type storage devices and which is of simpler form than those of the aforesaid copending application while still making use of the effect upon an applied alternating current signal of the non-linearity of the core hysteresis characteristic when in a state of remanent induction.

In accordance with the method of the present invention reading of the information stored in a hysteresis type storage device is effected by applying an input oscillatory signal of a first frequency $f1$ to said device to produce fluctuations of the induction state therein which extend over a non-linear region of the hysteresis characteristic of the storage body but which are insufficient to effect alteration of the polarisation direction, deriving an output signal from said device comprising a second frequency $f2$ which is harmonically related to said input signal and then determining the phase of said output signal with relation to a reference signal having a constant phase relationship to said input signal.

Apparatus in accordance with the invention comprises a hysteresis type storage device, for instance a magnetic body, adapted to be brought to a state of polarisation of one sense to define an element of information of one kind or a state of polarisation of the opposite sense to define an element of information of another kind, the two states of polarisation corresponding to two points on the hysteresis characteristic of the body lying in regions of non-linearity of such characteristic, the non-linearities of the two respective regions benig oppositely sensed, means for applying to said device an input oscillatory signal of a first frequency $f1$ to produce fluctuations of the induction state in the body which extend over a non-linear region of the hysteresis characteristic but which are insufficient to effect alteration of the polarisation direction, means for deriving an output signal from said device comprising a second frequency $f2$ which is harmonically related to said input signal and means for determining the phase relationship between said output signal and a reference signal having a constant phase relationship to said input signal.

In order that the nature of the invention may be more readily understood two embodiments thereof will now be described with reference to the accompanying drawings in which:

Fig. 1 is a schematic diagram illustrating a fragment of a storage matrix utilising magnetic core devices and provided with non-destructive reading arrangements according to the present invention.

Fig. 2 comprises a series of electric waveform diagrams, while

Fig. 3 is a fragmentary diagram illustrating a modification of the arrangement shown in Fig. 1.

Referring first to Fig. 1 of the drawings, there is shown a number of separate hysteresis type storage devices in the form of magnetic cores *a, b, c, d, e, f, g, h* and *i* forming a matrix storage arrangement which may be a part only of a larger matrix. In this figure, the cores *a, b . . . h, i* are each shown as being of an annular shape and are assumed to be formed of suitable magnetic material, such as a ferrite.

Each of the cores *a, b . . . h, i* is provided with two separate windings each constituted by a single conductor threading the core. The cores are arranged as a matrix of three horizontal rows and three vertical columns and the various windings are connected in series, as shown, along the respective horizontal rows and vertical columns so that, in effect, such windings comprise a first row conductor *n* threading cores *a, b* and *c*, a second row conductor *o* threading cores *d, e* and *f* and a third row conductor *p* threading cores *g, h* and *i* together with a first column conductor *q* threading cores *a, d* and *g*, a second column conductor *r* threading cores *b, e* and *h* and a third column conductor *s* threading cores *c, f* and *i*.

The row conductors *n, o* and *p* are connected respectively at one end to a different one of the separate terminals of a first or row-selector switch means RS which is shown symbolically in the drawing as a manually operable single-pole three-way selector switch by which any chosen one of such row conductors *n, o, p* may be connected to a single conductor t. The opposite end of each of the row conductors *n, o* and *p* is connected to earth. In similar manner, each of the column conductors *q, r, s* is connected to a different one of the separate terminals of a second or column selector switch means CS which is again shown symbolically in the drawing as a manually operable single-pole three-way selector switch by which any chosen one of such column conductors *q, r, s* may be connected to a single conductor *u*. The opposite end of each of the column conductors *q, r* and *s* is also connected to earth.

The conductor *t* from the common terminal of the row selector switch means RS is connected to the common terminal of a third selector switch means WRS1 which is shown symbolically in the drawing as a manually operable change-over switch while the conductor *u* from the common terminal of the column selector switch means CS is likewise connected to the common terminal of a fourth selector switch means WRS2 which is also shown symbolically as a manually operable change-over switch.

The switch means WRS1 and WRS2 are ganged together for conjoint operation and form a write/read control switch. In the position shown, such switch provides the requisite connections for a reading-out operation from the store whereas the opposite position is that used for a writing-in operation. The terminal *w* of each of switch means WRS1 and WRS2 is connected by way of conductor 10 to one terminal of a source WI of D.C. current or current pulses. This source WI is shown as comprising a battery B connected to a polarity-reversing switch DV. The conductor 10 is connected to one pole of the switch DV by way of a key switch K1 and a current limiting resistor R while the other pole of such switch DV is connected to earth as shown. The switch DV forms a control means for determining which of the two alternative digit values "0" or "1" is written into the store during a writing-in operation. Terminal *v* of switch means WRS1 is connected by way of conductor 11 to a source S of sinusoidal alternating current of frequency $f1$ controllable in its operation by means of key switch K2. The waveform of this alternating current is shown in Fig. 2(*a*). The terminal *v* of switch means WRS2 is connected by way of output conductor *x* to the input terminal of filter means F tuned to accept the second harmonic $2f1$ of the frequency $f1$ of the source S. The output from the filter F is applied to one input terminal 12 of a phase-sensitive rectifier circuit PSR. The other input terminal 13 of this phase-sensitive rectifier circuit is connected by way of conductor 14 to one winding *l* of a further and so-called "standard" magnetic core *y* which is of substantially identical form to that of the cores *a . . . i*. The winding *l*, which is again in the form of an interlinking conductor, has its opposite end connected to earth. The other winding conductor *m* threading this core *y* is arranged to be supplied with the frequency $f1$ from the source S by connection at one end to conductor 11 and at its other end to earth.

The manner of operation of the arrangement shown is as follows:

For the purpose of effecting writing into any one of the cores *a, b . . . h, i* of the matrix, the write/read control switches WRS1 and WRS2 are reversed from the position shown whereby the conductors *t* and *u* are each connected by way of conductors 10 to the source of D.C. current pulses WI. The row-selector switch means RS and the column-selector switch means CS are then adjusted to select the particular row and column conductors respectively which intersect in the required core. For example, if it is desired to write into core *b*, these selector switch means will be positioned as actually shown in the drawing. The digit-value switch DV is then set to the requisite one of its two alternative values and the key K1 then closed. This will cause the application of coincident currents over row conductor *n* and column conductor *r* to such core *b*. By suitable choice of the value of resistor R these currents will cause the core *b* to be driven into a state of magnetic saturation in the particular magnetisation direction chosen to represent the selected digit value and after reopening of key K1, such core *b* will remain magnetised in this sense.

In the use of the arrangement shown for reading the form of the information element already stored in any one of the cores $a$, $b$ . . . $h$, $i$, the read/write control switches WRS1 and WRS2 are put into the "read" position as shown and the row selector switch means RS controlled to select the particular row conductor $n$, $o$ or $p$ which intersects the required core while the column selector switch means CS is similarly controlled to select the particular column conductor $q$, $r$ or $s$ which also intersects the required core. The source S of alternating current at frequency $f1$ is then made operative by closing key K2 whereby such frequency is applied to the chosen row conductor, e.g. row conductor $n$, and will cause energisation of all of the cores $a$, $b$ and $c$ in this row. The winding $m$ of the "standard" core $y$ is simultaneously energised by this frequency $f1$. By reason of the non-linear magnetisation characteristic of the cores, at least one harmonic output frequency $f2$ will be produced in all of the column conductors $q$, $r$ and $s$ but, by reason of the selection of only one column conductor, i.e. conductor $r$ through the selector switch means CS, only that output frequency $2f1$ which is produced by the core $b$ will be fed from conductor $r$ through switch CS and over conductor $u$, switch means WRS2, conductor $x$ and filter F to input terminal 12 of the phase-sensitive rectifier circuit PSR. As the input terminal 13 of this phase-sensitive rectifier PSR is also supplied simultaneously with the output at frequency $2f1$ which is provided by winding $l$ of the "standard" core $y$ owing to the application of the frequency $f1$ of source S to its other winding $m$, the phase relationship between these two inputs will be indicative of the particular magnetisation state of the selected core $b$ of the matrix since the standard core $y$ is arranged to be held always in a predetermined state of magnetisation.

Thus if the selected core is in one state of magnetisation the output at frequency $2f1$ applied to terminal 12 of the phase-sensitive rectifier PSR will be as shown in Fig. 2($b$) whereas if the same core is in the other state of magnetisation the output to terminal 12 will be as shown in Fig. 2($c$). As the output from winding $l$ of the "standard" core $y$ will always be in a chosen one of these alternative forms, the output on lead 15 from the phase-sensitive rectifier will be indicative of the state of magnetisation of the selected core. Thus, if the standard core $y$ is arranged always to supply an input to terminal 13 of the phase-sensitive rectifier circuit PSR which conforms to that shown in Fig. 2($b$), the output on conductor 15 may be arranged to have zero value or substantially zero value when the selected core of the matrix is in the magnetisation state chosen to represent digit value "0" and of some appreciable potential value, either positive or negative according to the arrangement of the rectifier circuit PSR, when such selected core is in the opposite magnetisation state chosen to represent digit value "1."

Fig. 3 illustrates the modifications necessary in the arrangement of Fig. 1 to provide an alternative arrangement in which the use of a "standard" core, as shown at $y$ in Fig. 1, is avoided. In this modification a continuous series of strobe pulses of the form shown in Fig. 2($d$) are derived in a pulse generator circuit SPG which is controlled by connection of its control input 16 to the frequency source S providing the frequency $f1$. These strobe pulses, which always occur at a predetermined timing relationship with respect to the peaks of the frequency $f1$, are then fed over conductor 20 as a control medium to one input terminal 18 of a gating device GA. Another input terminal 17 of this device GA is supplied with the selected output frequency $2f1$ delivered by way of conductor $x$ and filter F from the switch means WRS2. The remainder of the circuit is as shown in Fig. 1.

The aforesaid gating device GA is arranged to pass current only when opened by the positive-going strobe pulses and if these are timed to coincide with alternate similar peaks of the output frequency $2f1$, the output from the device GA will be of one polarity when the selected core is in one magnetisation state and of the opposite polarity when it is in the other magnetisation state.

Although the various magnetic cores have been shown as of annular shape it will be understood that their shape is immaterial while any suitable magnetic material having an appropriate form of hysteresis loop characteristic may be used for their formation. Similarly, the various switch means such as RS, CS, WRS1 and WRS2 may be of any suitable form and may consist, in the case where high speed electronic control is required, of a plurality of coincidence gate circuits such as described by C. H. Page in "Electronics," September 1948, pages 110–118. Alternatively, such switching means may comprise an assemblage of further magnetic core devices as already well known for effecting row and column selection in magnetic core storage devices.

The source of S of frequency $f1$ may be of any convenient and well known form such as a thermionic valve oscillator whose oscillatory output is controllable such as by switching the anode current supply or by application of appropriate blocking potentials to its control grid. In the case of application of the invention to high speed electronic computers the key K2 would be replaced by a gate circuit or like means controlled by a suitable pulse waveform of the machine, for instance, the usual master or clock waveform.

The amplitude of the alternating current of frequency $f1$ derived from the source S is not critical but for small amplitudes of input current the output signal $f2$ at the second harmonic frequency $2f1$ which is derived from the selected core is necessarily small since, for only small amplitudes of magnetising current variation, the magnetisation characteristic of the saturated core material is usually substantially linear. As the amplitude of the input current at frequency $f1$ is increased, however, the output of the harmonic frequency $2f1$ increases rapidly and the largest signals are obtainable at the point where destruction of the stored information in the selected core is likely to take place, i.e. when the amplitude of the applied current is sufficient to switch the state of magnetisation of the core. A suitable amplitude for the current of frequency $f1$, which is appreciably less than such critical value but which is adequate to provide a satisfactory output, can readily be chosen.

For effective operation of the system there must obviously be no appreciable second harmonic component (frequency $2f1$) present in the original input frequency $f1$ from the source S. The presence of any such second harmonic component may be avoided by the use of known filtering and balanced circuit techniques. If the switching circuits corresponding to the switches RS, CS, WRS1 and WRS2 employed for selection of the appropriate row and column conductors are of the magnetic core type, little or no difficulty on account of second harmonic production is experienced as any magnetic cores employed in these switches would be operated over the linear regions of their magnetisation characteristic.

The filter F may be of any known convenient form, e.g. an inductance/capacitance network, while the phase-sensitive rectifier circuit PSR may be of the form described in M.I.T. Radiation Laboratory Series, vol. 21 (1948), McGraw-Hill, p. 384, Figs. 12–14. The strobe pulse generator SPG may comprise a pulse squaring arrangement such as is described in M.I.T. Radiation Laboratory Series, vol. 19 (1949), McGraw-Hill, p. 10, Figs. 1–3, followed by a differentiating network whose output is used as a triggering medium for a monostable multivibrator circuit such as is described in the aforesaid vol. 19 of the M.I.T. Radiation Laboratory Series at pp. 166–171. The gate circuit device GA is conveniently in the form of a pentode valve having the harmonic frequency input $f2$ from filter F applied to its control grid and the strobe pulse waveform from generator SPG applied to its suppressor grid, such strobe pulse waveform having a negative resting level below the cut-off point of such suppressor grid. The anode output pulses of the pentode valve are integrated in a suitable R/C circuit.

It will be clear that if it is desired to operate such a magnetic core type of storage device with parallel mode output signals it is possible to read the contents of all of the cores in a given row by energising that row conductor with frequency $f1$ and reading out from the separate column conductors simultaneously in parallel, the phase of the output frequency $2f1$ from each column conductor being simultaneously tested for sign.

While it will be clear that the arrangements described can form a two-dimensional matrix store, they can also be used for one level of a three-dimensional matrix store. Multi-digit number signals can be recorded in or reproduced from either of such stores in either parallel or serial form in known manner by suitable arrangement of the row and column conductors with appropriate switching apparatus.

Although the invention has been more particularly described with reference to hysteresis storage devices of the magnetic core type, it will be apparent to those skilled in the art that similar arrangements embodying the features of the invention may readily be devised for use with dielectric type storage devices.

We claim:

1. An apparatus arrangement for reading information stored in a hysteresis type storage device of the kind in which information is stored by the retentivity of the device when the energization necessary to effect input of such information is removed, which comprises means for applying to said devices an input oscillatory signal of a first frequency $f1$ to produce fluctuations in the induction state of such device which extend over a non-linear region of the hysteresis characteristic of the storage device but which are insufficient to effect alteration of the polarization dericetion of such device, means for deriving output signals from said device said deriving means including means for isolating signals at a second frequency $f2$ which is the second harmonic $2f1$ of said input signal, a source of a reference signal of frequency $2f1$ having a predetermined phase relationship to said input signal and phase-comparison means supplied with said isolated output signal and said reference signal for determining the phase-relationship therebetween.

2. An apparatus arrangement for reading information stored in a hysteresis type storage device of the kind in which information is stored by the retentivity of the device when the energization necessary to effect input of such information is removed, which comprises means for applying to said device an input oscillatory signal of a first frequency $f1$ to produce fluctuations of the induction state of such device which extend over a non-linear region of the hysteresis characteristic of the storage device but which are insufficient to effect alteration of the polarization direction, means for deriving output signals from said device, said deriving means including means for isolating a signal at a second frequency $f2$ which is harmonically related to said input signal, a source of a reference signal having a constant phase relationship to said input signal and phase determining means supplied with said isolated output signal and said reference signal for determining the phase relationship therebetween as an indication of the polarization direction of the induction state of said storage device.

3. An arrangement according to claim 2 in which said phase determining means comprises a phase-sensitive rectifier circuit.

4. An arrangement as claimed in claim 2 in which said source of reference signals comprises a further similar hysteresis type storage device arranged to be supplied with said input signal and to be maintained continuously in a predetermined state of polarisation.

5. An arrangement as claimed in claim 2 in which said source of reference signals comprises a strobe pulse generator connected so as to be controlled as to its pulse timing, by said input signal.

6. An arrangement as claimed in claim 2 in which said isolated output signal is the second harmonic $2f1$ of said input signal.

7. An arrangement as claimed in claim 6 in which said means for determining the phase relationship between said isolated output signal and said reference signal comprises a gate circuit device having a first controlling input arranged to be supplied with said output signal and a second controlling input arranged to be supplied with said reference pulse waveform from said strobe pulse generator.

8. An apparatus arrangement for reading information stored in a hysteresis type storage device including a retentive magnetic core adapted to be magnetized to a state of remanent magnetization having a polarization of one sense to define an element of information of one kind or a state of remanent magnetization having a polarization of the opposite sense to define an element of information of another kind, the two states of remanent magnetization corresponding to two points on the hysteresis characteristic of the core in regions of non-linearity of such characteristic, the non-linearities of the two regions being of opposite sense, said core having at least separate first and second windings inductively associated therewith, which arrangement comprises means for applying to said first winding an input oscillatory signal of a first frequency $f1$ to produce fluctuations in the induction state of such device which extend over one or the other of said non-linear regions of the hysteresis characteristic of the storage device but which are insufficient to effect alteration of the polarization direction of said device, means coupled to said second winding for deriving output signals from said device, said output signal deriving means including means for isolating output signals at a second frequency $f2$ which is harmonically related to said input signal, a source of a reference signal having a constant phase relationship to said input signal and phase comparison means supplied with said isolated output signal and said reference signal for determining the phase relationship therebetween as a measure of the polarization sense of the remanent magnetism in said magnetic core.

9. An information storage arrangement comprising a plurality of hysteresis type storage devices each including a retentive magnetic core adapted to be magnetized to a state of remanent magnetization having a polarisation of one sense to define an element of information of one kind or a state of remanent magnetization having a polarisation of the opposite sense to define an element of information of another kind, the two states of remanent magnetization corresponding to two points on the hysteresis characteristic of the core in regions of non-linearity of such characteristics, the non-linearities of the two regions being of opposite sense, said core having at least separate first and second windings inductively associated therewith, said cores being arranged in a matrix of interlaced connections of said first and second windings to define a plurality of row conductors and column conductors respectively with any one storage device disposed in only one row conductor and in only one column conductor and stored information reading means which comprises a source of oscillatory input signals of a first frequency $f1$, first switching means for applying said input signal to a selected row conductor which includes a particular required storage device to produce fluctuations of the induction state of each of the devices whose respective first windings are associated with said row conductor, which fluctuations extend over one or other of said non-linear regions of the hysteresis characteristic of the respective storage devices but which are insufficient to effect alteration of the polarization directions of such devices, phase indicator means having first and second alternating current inputs, second switching means for connecting that one of said colum conductors which includes a second winding of said particular storage device to the first alternating current input of said phase indicator means, means for deriving from said connected column conductor an output signal comprising a second frequency $f2$ which is harmonically related to said input signal and a source of reference signals having a constant phase relationship to said input signal, said source being connected to the second alternating current input of said phase indicator means.

10. An apparatus arrangement for reading information stored in a hysteresis type storage device which includes a retentive core adapted to be magnetized to a state of remanent magnetization having a polarisation of one sense to define an element of information of one kind or a state of remanent magnetization having a polarisation of the opposite sense to define an element of information of another kind, the two states of remanent magnetization corresponding to two points on the hysteresis characteristic of the core in regions of non-linearity of such characteristic, the non-linearities of the two regions being of oposite sense, said core having at least separate first and second windings inductively associated therewith, which arrangement comprises a source of input oscillatory signals of a first frequency $f1$, means for applying said input signals to said first winding to produce fluctuations in the induction state of such device which extend over one or other of said non-linear regions of the hysteresis characteristic of the storage device but which are insufficient to effect alteration of the polarization direction of such device, means coupled to said second winding for deriving an output signal from said device comprising a second frequency $f2$ which is the second harmonic $2f1$ of said input signal, a source of reference signals of frequency $2f1$ having a predetermined phase relationship to said input signals and phase indicator means connected to be supplied with said derived output signals and said reference signals.

11. An apparatus arrangement for reading information stored in a hysteresis type storage device which includes a retentive magnetic core adapted to be magnetized to a state of remanent magnetization having a polarisation of one sense to define an element of information of one kind or a state or remanent magnetization having a polarisation of the opposite sense to define an element of information of another kind, the two states of remanent magnetization corresponding to two points of the hysteresis characteristic of the core in regions of nonlinearity of such characteristic, the non-linearities of the two regions being of opposite sense, said core having separate first and second windings inductively associated therewith, which arrangement comprises means for applying to said first winding an input oscillatory signal of a first frequency $f1$ to produce fluctuations in the induction state of such device which extend over one or other of said non-linear regions of the hysteresis characteristic of the storage device but which are insufficient to effect alteration of the polarization direction of such device, means coupled to said second winding for deriving a first output signal from said device comprising a second frequency $f2$ which is harmonically related to said input signal, reference signal generating means comprising a further similar hysteresis type storage device having a first winding connected to be supplied with said input signal of frequencq $f1$ and a second winding for deriving a second output signal of said second frequency $f2$, said further storage device being maintained continuously in a predetermined state of polarization and phase indicator means supplied with said first and second output signals for determining the phase relationship therebetween.

12. An apparatus arrangement according to claim 11 wherein said phase indicator means comprises a phase sensitive rectifier circuit.

13. An information storage arrangement comprising a plurality of hysteresis type storage devices each including a retentive magnetic core adapted to be magnetized to a state of remanent magnetization having a polarization of one sence to define an element of information of one kind or a state of remanent magnetization having a polarization of the opposite sense to define an element of information of another kind, the two states of remanent magnetization corresponding to two points on the hysteresis characteristic of the core in regions of non-linearity of such characteristic, the non-linearities of the two regions being of opposite sense, said core having at least separate first and second windings inductively associated therewith, said cores being arranged in a matrix of interlaced connections of said first and second windings to define a plurality of row conductors and column conductors respectively with any one storage device having its first winding disposed in only one row conductor and having its second winding disposed in only one column cinductor and stored information reading means which comprises means for applying to a selected row conductor which includes a particular required storage device, an oscillatory input signal of a first frequency $f1$ to produce fluctuations of the induction state of each of the devices whose respective first windings are associated with said row conductor, which fluctuations extend over one or other of said non-linear regions of the hysteresis characteristic of the respective storage devices but which are insufficient to effect alteration of the polarization directions of such devices, means for deriving from that one of said column conductors which includes a second winding of said particular storage device an ouput signal comprising a second frequency $f2$ which is harmonically related to said input signal, a source of a reference signal having a constant phase relationship to said input signal and phase comparison means supplied with said derived output signal and said reference signal for determining the phase relationship between such signals as an indication of the kind of information element recorded in said particular storage device.

References Cited in the file of this patent

UNITED STATES PATENTS

| | | |
|---|---|---|
| 2,574,438 | Rossi | Nov. 6, 1951 |
| 2,614,167 | Kamm | Oct. 14, 1952 |
| 2,697,825 | Lord | Dec. 21, 1954 |
| 2,776,419 | Rajchman et al. | Jan. 1, 1957 |
| 2,832,945 | Christensen | Apr. 29, 1958 |

OTHER REFERENCES

"A Radio-Frequency Nondescructive Readout for Magnetic-Core Memories," by Bernard Widrow, published in the December 1954 issue of "IRE Transactions-Electronic Computers."